(12) United States Patent
Ha et al.

(10) Patent No.: US 12,535,991 B2
(45) Date of Patent: Jan. 27, 2026

(54) APPARATUS AND METHOD FOR PERFORMING ACCUMULATION OPERATIONS

(71) Applicant: Arm Limited, Cambridge (GB)

(72) Inventors: Sangwon Ha, Cambridge (GB); Neil Burgess, Cardiff (GB); Partha Prasun Maji, Cambridge (GB)

(73) Assignee: Arm Limited, Cambridge (GB)

( * ) Notice: Subject to any disclaimer, the term of this patent is extended or adjusted under 35 U.S.C. 154(b) by 897 days.

(21) Appl. No.: 17/840,908

(22) Filed: Jun. 15, 2022

(65) Prior Publication Data

US 2023/0409286 A1 Dec. 21, 2023

(51) Int. Cl.
*G06F 7/509* (2006.01)

(52) U.S. Cl.
CPC .................. *G06F 7/5095* (2013.01)

(58) Field of Classification Search
CPC ............ G06F 7/509–5095; G06F 7/5443
See application file for complete search history.

(56) References Cited

U.S. PATENT DOCUMENTS

| | | | |
|---|---|---|---|
| 2017/0139673 A1* | 5/2017 | Burgess | G06F 7/50 |
| 2017/0139675 A1 | 5/2017 | Burgess et al. | |
| 2017/0139677 A1* | 5/2017 | Lutz | G06F 7/5443 |
| 2023/0092574 A1* | 3/2023 | Dibrino | G06F 7/4876 |
| 2024/0036822 A1* | 2/2024 | Burgess | G06F 7/483 |

FOREIGN PATENT DOCUMENTS

WO WO-2022204620 A2 * 9/2022 ............ G06F 7/5443

OTHER PUBLICATIONS

Uguen, Yohann, and Florent de Dinechin. "Design-space exploration for the Kulisch accumulator." (2017). (Year: 2017).*

* cited by examiner

*Primary Examiner* — Matthew D Sandifer
(74) *Attorney, Agent, or Firm* — NIXON & VANDERHYE P.C.

(57) ABSTRACT

An apparatus has processing circuitry to perform an accumulation operation in which a first addend is added to a second addend. The apparatus has storage circuitry to store the second addend in a plurality of lanes, each lane having a significance different to that of each other lane. Each lane within at least a subset of the lanes comprises at least one overlap bit having the same bit significance as a bit in an adjacent more significant lane in the plurality of lanes. The accumulation operation includes selecting an accumulating lane out of the plurality of lanes and performing an addition operation between bits of the accumulating lane and the first addend. The at least one overlap bit of the accumulating lane enables the addition operation to be performed without a possibility of overflowing the accumulating lane.

20 Claims, 11 Drawing Sheets

FIG. 9

Initial State

| | | | | | | | | | | | | | |
|---|---|---|---|---|---|---|---|---|---|---|---|---|---|
| Lane 1 | | | 0 | 0 | 1 | 1 | 1 | 1 | 1 | 1 | | | 64512 |
| Acc. Lane 2 | | | | | | | 0 | 0 | 1 | 1 | 1 | 1 | 992 |
| Lane 3 | | | | | | | | | 0 | 0 | 1 | 1 | 31 / 65535 |

Target Lane: 3
IB: 0 1 1 1 0 0 0 0 → 112
TLSB: 0

After Accumulation

| Lane 1 | 0 0 1 1 1 1 1 1 | 64512 |
| Acc. Lane 2 | 1 1 1 1 | 992 |
| Lane 3 | 1 0 0 0 1 1 1 1 | 143 / 65647 |

Target Lane: 2
IB: 0 0 0 0 0 1 0 0 → 128
TLSB: 0

1) copy from overlapping bits of Lane 3
2) sign extend with TLSB

After Lane 3 Flush

| Lane 1 | 0 0 1 1 1 1 1 1 | 64512 |
| Acc. Lane 2 | 0 0 0 1 1 1 1 1 | 1120 |
| Lane 3 | 1 1 1 1 | 15 / 65647 |

Target Lane: 1
IB: 0 0 0 0 0 0 0 1 → 1024
TLSB: 0

1) copy from overlapping bits of Lane 2
2) sign extend with TLSB

After Lane 2 Flush

| Lane 1 | 0 1 0 0 0 0 0 0 | 65536 |
| Acc. Lane 2 | 0 0 0 1 1 0 0 0 | 96 |
| Lane 3 | 1 1 1 1 | 15 / 65647 |

Target Lane: (Lane 1)
IB: 0 → 0  populated with next input
TLSB: populated with next input
       populated with next input

FIG. 10

APPARATUS AND METHOD FOR PERFORMING ACCUMULATION OPERATIONS

BACKGROUND

Technical Field

The present technique relates to the field of data processing.

Technical Background

A data processing apparatus may perform an accumulation operation in which a first addend is added to a second addend to produce an updated second addend. In modern data processing systems, power consumption is a significant issue and it is desirable to reduce power consumption. It would therefore be desirable to reduce the power used to perform an accumulation operation.

SUMMARY

Viewed from aspect, the present technique provides an apparatus, comprising:
processing circuitry configured to perform an accumulation operation in which a first addend is added to a second addend to produce an updated second addend; and
storage circuitry configured to store the second addend in a plurality of lanes, each lane storing a plurality of contiguous bits of the second addend, and each lane having a significance different to that of each other lane, wherein a more significant lane has at least one bit with a higher bit significance than the most significant bit of a less significant lane;
wherein each lane within at least a subset of the plurality of lanes comprises at least one overlap bit, each overlap bit having the same bit significance as a bit in an adjacent more significant lane in the plurality of lanes;
wherein the processing circuitry is arranged to perform the accumulation operation by:
referencing bit significance information corresponding to the first addend to select an accumulating lane out of the plurality of lanes; and
performing an addition operation between bits of the accumulating lane and the first addend.

Viewed from another aspect, the present technique provides a method, comprising:
performing, using processing circuitry, an accumulation operation in which a first addend is added to a second addend to produce an updated second addend; and
storing the second addend in a plurality of lanes within storage circuitry, each lane storing a plurality of contiguous bits of the second addend, and each lane having a significance different to that of each other lane, wherein a more significant lane has at least one bit with a higher bit significance than the most significant bit of a less significant lane;
wherein each lane within at least a subset of the plurality of lanes comprises at least one overlap bit, each overlap bit having the same bit significance as a bit in an adjacent more significant lane in the plurality of lanes;
wherein the accumulation operation is performed by the processing circuitry by:
referencing bit significance information corresponding to the first addend to select an accumulating lane out of the plurality of lanes; and
performing an addition operation between bits of the accumulating lane and the first addend.

Viewed from yet another aspect, the present technique provides a non-transitory computer-readable medium to store computer-readable code for fabrication of an apparatus comprising:
processing circuitry configured to perform an accumulation operation in which a first addend is added to a second addend to produce an updated second addend; and
storage circuitry configured to store the second addend in a plurality of lanes, each lane storing a plurality of contiguous bits of the second addend, and each lane having a significance different to that of each other lane, wherein a more significant lane has at least one bit with a higher bit significance than the most significant bit of a less significant lane;
wherein each lane within at least a subset of the plurality of lanes comprises at least one overlap bit, each overlap bit having the same bit significance as a bit in an adjacent more significant lane in the plurality of lanes;
wherein the processing circuitry is arranged to perform the accumulation operation by:
referencing bit significance information corresponding to the first addend to select an accumulating lane out of the plurality of lanes; and
performing an addition operation between bits of the accumulating lane and the first addend.

Further aspects, features and advantages of the present technique will be apparent from the following description of examples, which is to be read in conjunction with the accompanying drawings.

BRIEF DESCRIPTION OF THE DRAWINGS

FIGS. 8-10 illustrate examples of accumulation and overlap update operations.

DESCRIPTION OF EXAMPLES

Figure 1:
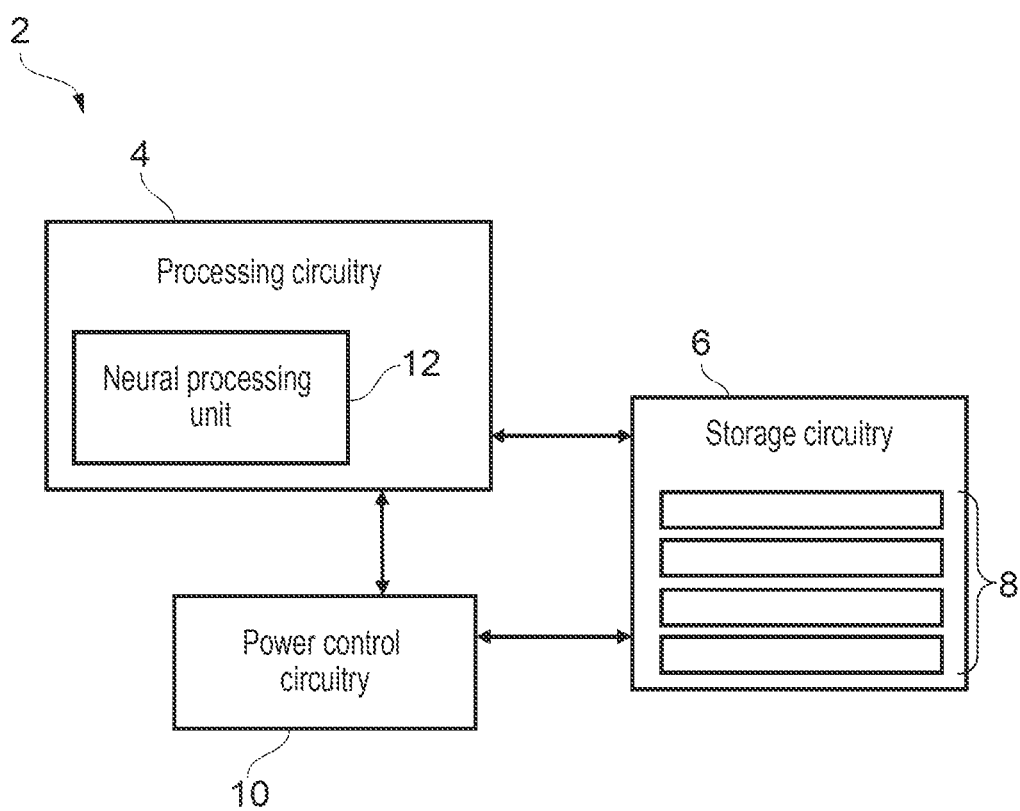
FIG. 1 schematically illustrates an example of a data processing apparatus.

An apparatus has processing circuitry to perform an accumulation operation in which a first addend is added to a second addend to produce an updated second added. The first addend and second addend are not particularly limited. For example, the addends may both be integers, or one or both addends may be derived from the mantissa of a floating point value. Further, in some examples two values to be accumulated may be positive, and therefore the addition between the first and second addends performed in the accumulation operation represents an addition between the two values. However, in other examples one of the addends may have been obtained by calculating a two's complement of a value, and therefore the addition of the first and second addends performed in the accumulation operation may represent a subtraction of one value from another.

Prior to the present technique, the second addend may be stored in a single accumulation buffer. In such a technique, the accumulation operation may involve accessing the accumulation buffer and then performing the accumulation operation between the first addend and the second addend stored in the accumulation buffer. The inventors have recognised that there are situations in which the first addend and the second addend have different magnitudes. In these cases, in order to preserve the value of the first addend when it is accumulated onto the second addend, it may be required to represent the second addend in a large accumulation buffer. If the accumulation buffer were too small and did not cover a wide enough range, then the first addend may be entirely out of range or may be rounded during the accumulation operation and therefore some of the information encoded in the first addend may be lost. The greater the difference in magnitude between the two addends, the larger the buffer required to preserve both values. However, providing a large buffer is associated with high overhead. For example, there will be a high power usage associated with accessing a single large accumulation buffer during the accumulation operation.

In accordance with the present technique, instead of storing the second addend in one large buffer, the second addend is stored across a plurality of smaller buffers. Each smaller buffer is called a lane. Each lane stores a plurality of contiguous bits of the second addend such that each lane covers a subset of the range required to represent the second addend, and the combination of lanes covers the entire range required to represent the second addend. Each lane also has a significance different to that of each other lane, wherein a more significant lane has at least one bit with a higher bit significance than the most significant bit of a less significant lane. This means that the lanes are logically arranged in a cascaded fashion, with the least significant lane storing the least significant bits of the second addend, and each more significant lane storing more significant bits.

Lanes which are adjacent to a given lane include the lane that is more significant than the given lane and less significant than all other more significant lanes, and the lane that is less significant than the given lane and more significant than all other less significant lanes. Each lane within at least a subset of the lanes (in one implementation each lane other than the most significant lane) comprises at least one overlap bit, each overlap bit having the same bit significance as a bit in an adjacent more significant lane in the plurality of lanes. Therefore, the overlap bits are located at the most significant bit positions of each lane other than the most significant lane.

The processing circuitry performs an accumulation operation using the plurality of lanes by referencing bit significance information corresponding to the first addend to select an accumulating lane out of the plurality of lanes. The bit significance information is any information which can be used to assign a bit significance to bits of the first addend. For example, if the first addend is derived from the mantissa of a floating point value, then the bit significance information may be derived from the value of the exponent of the floating point value. In some examples the bit significance information may be implicit in the format that the first addend has been represented. The selected lane is the lane which stores bits of the second addend having the same bit significance as the bits of the first addend which are to be added to the second addend. Once a lane has been selected as the accumulating lane, the processing circuitry performs an addition operation between bits of the accumulating lane and the first addend. The addition operation may involve storing the first addend in an input buffer and adding the bits of the input buffer and the accumulating lane, for example. In some examples, the addition operation may also include performing a sign extension operation on the first addend before it is added to the accumulating lane. For example, if it is determined that the addition operation represents a subtraction between values (for example if the first addend has been derived by calculating a two's complement) then the first addend may be sign extended by 1s. Otherwise, the first addend might be sign extended by 0s before it is added to the accumulating lane.

The at least one overlap bit of the accumulating lane enables the addition operation to be performed without a possibility of overflowing the accumulating lane. For example, the at least one overlap bit may be clear (having the value of 0 for a positive lane or 1 for a negative lane) such that if the addition operation overflows the non-overlap bits of the accumulating lane, then the addition overflows into the overlap bits within the accumulating lane but does not overflow the overlap bits and hence does not overflow the accumulating lane. In some examples the at least one overlap bit may not be entirely clear, but may be selected such that overflow of the accumulating lane is nevertheless not possible.

Hence, the second addend is stored in a plurality of lanes and processing circuitry performs an accumulation operation by selecting a single accumulating lane out of the plurality of lanes. Therefore, instead of accessing a single large buffer storing the entire second addend, the accumulation can be performed by accessing a smaller buffer storing only the lane of the second addend which is needed to perform the accumulation operation. Therefore, the proposed apparatus can be associated with a reduced overhead, because accessing a smaller buffer requires less power than accessing a larger buffer. In addition, the overlap bits ensure that the accumulation operation can be performed correctly within a single lane without overflowing. This means that the accumulation operation does not require any access to more than one lane. If no overlap bits were provided, for example, and the accumulation operation were to overflow the accumulating lane, then an access to a more significant lane may be required to carry the overflow into the more significant lane. This access to a second lane to carry the overflow is not required when overlap bits are provided in the accumulating lane, and hence the power cost associated with accessing a second lane, and the logic overhead required to identify and carry the overflow, can be reduced.

In some examples, there may be no particular limitation on the number of overlap bits to be provided. For example, providing a single overlap bit in each lane may ensure that an accumulating lane does not overflow for certain accumulation operations, such as where the first addend is added entirely to the non-overlap bits of the accumulating lane. Hence, each accumulation operation may be performed without the possibility of overflowing the accumulating lane. However, there may be a restricted number of accumulation operations which are supported for certain numbers of overlap bits to ensure that at least one overlap bit is not included in the addition operation. In some examples the number of overlap bits provided in each lane other than the most significant lane may be equal to or greater than the number of bits of the first addend. For example, if the first addend is known to be a 3-bit addend, then there may be 3 or more overlap bits in each lane other than the most significant lane. This means that for any accumulation operation, even if the first addend is to be added to bit positions including both non-overlap and overlap bits, overflow of the accumulating lane is not possible because there will be at least one overlap bit not included in the addition operation. This is because if the first addend were to entirely overlap with the overlap bits (leaving no overlap bits not included in the addition operation), then the addition operation could be performed in the corresponding bit positions of the adjacent more significant lane (each overlap bit has a bit with the same bit significance in the adjacent more significant lane), and hence in non-overlap bits of the adjacent more significant lane. Providing more overlap bits than the number of bits in the first addend may not be necessary to prevent overflow in a single accumulation operation. However, if several accumulation operations are performed in a sequence then providing more overlap bits may reduce the frequency with which overlap bits are updated (to be discussed below).

In some examples, the processing circuitry may be configured to perform individual accumulation operations. However, in some examples the processing circuitry is configured to perform a series of accumulation operations, wherein the second addend is updated in response to performance of each accumulation operation in the series. For example, the processing circuitry may perform a recurring operation wherein the second addend is updated a number of times. The overhead reduction associated with the present technique is more pronounced in this example, because the overhead reduction will be associated with each accumulation operation in the series of accumulation operations, and hence significant power savings can be achieved.

Following a number of accumulation operations, one or more of the at least one overlap bits may have become set. This may be because of an overflow of the non-overlap bits into the overlap bits or due to an accumulation operation in which a first addend was added directly to an overlap bit. In some cases overflow of the accumulating lane is still not possible when some overlap bits are set (for example, if more overlap bits are provided than the number of bits in the first addend). However, in some cases, when one or more overlap bits are set then the overlap bits may no longer prevent an accumulation operation from overflowing. This may not be a problem if the processing circuitry is only configured to perform a single accumulation operation, but may be undesirable when a series of accumulation operations is to be performed. Hence, in some examples the processing circuitry is configured to perform an overlap update operation.

In the overlap update operation, the values of one or more of the at least one overlap bit of a given lane are added to one or more bits with the same bit significance in the adjacent more significant lane. This updates the value of the subset of bits of the second addend stored in the adjacent more significant lane according to the value of the overlap bits. Following the addition, the overlap bits of the given lane are then set to a predetermined value. For example, if all of the overlap bits of the given lane are added into the adjacent more significant lane, then all of the overlap bits of the given lane may be cleared (all set to 0 or 1). However, if not all of the overlap bits are added into the adjacent more significant lane, then only the bits which have been added into the adjacent more significant lane may be cleared. In some examples, at least the most significant overlap bit which is set may be added to the adjacent more significant lane (and subsequently cleared), and therefore the one or more overlap bits includes at least the most significant set overlap bit. The overlap update operation does not change the value of the second addend, but merely rearranges the lanes in which each bit is stored.

The overlap update operation may be considered to be an accumulation operation in which the first addend is the one or more overlap bits of the given lane and the accumulating lane is the more significant lane which is adjacent to the given lane. In this example, the bit significance information is implicit because the bit significance of the first addend is known from the level of overlap between lanes, and it is known that the selected lane is to be the more significant lane adjacent to the given lane.

By setting a number of overlap bits of the given lane to a predetermined value in the overlap update operation (for example by clearing them), then future accumulation operations may be performed without overflowing the accumulating lane when the given lane is selected as the accumulating lane. This therefore supports examples in which a series of accumulation operations are performed.

The overlap update operation is performed in response to a trigger condition. In a simple example, the trigger condition may be the end of an accumulation operation, and hence the overlap bits are updated at the end of every accumulation operation. This would ensure that a series of accumulations can be performed without a possibility of overflow, and would require very little trigger condition logic. However, this may be undesirable as many accumulation operations can be completed without setting any overlap bits in the accumulating lane, and hence it would be unnecessary to incur the cost of the overlap update operation every time the accumulation operation is performed.

Hence, in some examples the trigger condition comprises detecting that, following a given accumulation operation, any of the overlap bits of the accumulating lane have different values from each other. If any overlap bits take different values from each other, then this suggests that at least one overlap bit has been set in the accumulation operation. Hence, it may be desirable to perform an overlap update operation to avoid the possibility of the accumulating lane overflowing in a future accumulation operation. This example avoids incurring the cost of the overlap update operation following every accumulation operation. However, this may still lead to more overlap update operations than are necessary.

Therefore, a further example of an overlap update operation comprises detecting two conditions. The first addend is derived from a first value. For example, the first addend may be derived from a floating point value, and therefore the floating point value is the first value. The overlap update operation is performed if both: any of the overlap bits of the accumulating lane have different values from each other, and the sign of the first value is the same as the sign of the accumulating lane prior to the given accumulation operation. If the sign of the first value differs from the sign of the accumulating lane prior to the given accumulation operation, then the accumulation operation involves subtracting a value from a positive accumulating lane (note that this is still performed by an addition operation by adding a two's complement addend) or adding a value to a negative accumulating lane, and hence the magnitude of the value represented by the accumulating lane is decreasing. Therefore, the accumulating lane cannot be any closer to overflow following the accumulation operation than before if the signs of the accumulating lane prior to the accumulation operation and the sign of the first value differ, and hence an overlap update operation is not necessary in that case.

In order to detect whether the sign of the first value is the same as the sign of the accumulating lane prior to the given accumulation operation, the apparatus may also comprise a target lane sign buffer. The processing circuitry is configured to store a value indicating the sign of the accumulating lane to the target lane sign buffer prior to performing the given accumulation operation, such that after the accumulation operation, processing circuitry can determine whether or not the trigger condition is satisfied. The target lane sign buffer may also be reused for other purposes. For example, if it is determined that the trigger condition is satisfied and an overlap update operation is required, then the overlap bits may be selected as a first addend in an accumulation operation to carry out the overlap update operation. The overlap bits (the first addend) may be stored in an input buffer, and the value of the target lane sign buffer (which indicates the sign of the accumulating lane prior to the previous accumulation operation) can be used to determine how to sign-extend the first addend for the addition operation. For example, if the accumulating lane was positive prior to the accumulation operation, then the overlap bits should be positive (and hence the input buffer should be sign-extended by 0s) and vice versa.

In some examples, the apparatus comprises power control circuitry to place lanes of the plurality of lanes other than the accumulating lane into a lower power level than the accumulating lane during the accumulation operation. Therefore, power consumption associated with those parts of the second addend that are not used in the accumulation operation is reduced, reducing power consumption compared to the case where the entire second addend is represented in one buffer. One or more of the plurality of lanes other than the accumulating lane may be placed into the lower power level, but power usage is minimised when all lanes other than the accumulating lane are placed into the lower power level.

In some examples, each lane of the plurality of lanes is stored in a separate storage block within the storage circuitry. For example, each lane may be stored in a separate register.

There may be a power cost associated with accessing a given storage block. In some examples, the processing circuitry is configured to access the storage block corresponding to the accumulating lane and to not access the storage blocks corresponding to lanes other than the accumulating lane. Therefore, the power cost associated with retrieving a given storage block is only incurred for the accumulating lane and not for the lanes other than the accumulating lane. Hence, overhead associated with performing an accumulation operation can be reduced by only incurring the overhead for a selected region of a second addend, compared to incurring the cost for the entire second addend.

In some examples the first addend may be derived from a first floating point value. In this case, the accumulation operation may accumulate the first floating point value with the second addend. The processing circuitry may be configured to derive the first addend from the mantissa of the first floating point value. The first addend may be derived from a subset of bits of the mantissa such as the N most significant bits of the mantissa of the first floating point value where N is equal to the number of bits of the first addend. However, this may involve rounding the first floating point value and therefore in some examples the first addend may be derived from all of the bits of the mantissa.

In some examples a subset of bits of the second addend comprise the mantissa bits of a second floating point value. Therefore, the accumulation operation may accumulate the first floating point value with the second floating point value. In some examples, all of the bits of the second addend are mantissa bits of the second floating point value. In other examples, the least significant bits of the second addend may not be mantissa bits of the second floating point value. In these examples, the second addend is therefore longer than the mantissa of the second floating point value. This allows values to be accumulated into the second floating point value without being lost to rounding or being out of range. For example, if many small updates are made to the second floating point value, where the updates are individually smaller than the least significant bit of the mantissa of the second floating point value, then if no bits were provided with the same bit significance as each small update, the updates would be lost. However, the sum of several updates may be large enough to have an effect on the mantissa bits of the second floating point value, and therefore discarding them could lead to incorrect results. By providing the second addend so as to include bits with lower bit significance than the least significant bit of the mantissa of the second floating point value, these updates can be recorded and the mantissa can be updated if the updates sum to a large enough value. If the second floating point value is read from the storage circuitry, for example as an input in an operation other than the accumulation operation, then in some examples only the bits corresponding to the mantissa bits of the second floating point value are read. For example, only the top lane may be retrieved from the storage circuitry (in an example implementation where all of the mantissa bits of the second floating point value are stored within the single top lane). However, maintaining more bits in the storage circuitry allows the mantissa bits to be updated accurately.

In some examples, the processing circuitry is configured to derive the first addend by determining whether the first floating point value and the second floating point value have the same sign as each other or whether they have the opposite sign to each other. When the first and second floating point values have the same sign, then the accumulation operation represents an addition of the first floating point value and the second floating point value. Hence, the first addend is derived by taking the value of the mantissa of the first floating point value as the first addend. When the first and second floating point values have the opposite sign to each other, then the accumulation operation represents a subtraction of one of the first or second floating point values from the other. In this case, the first addend is derived by calculating the two's complement of the mantissa of the first floating point value. In some examples, the first addend may be sign-extended during the addition operation. The first addend may be sign-extended to represent a negative number (for example, sign extended by 1s) in response to determining that the first addend has been derived by calculating a two's complement, as this indicates that the first addend is a negative value relative to the second addend. In some examples, the first addend may be modified prior to the accumulation operation (for example, by adding 1 when taking overlap bits of a negative lane as the first addend in an overlap update operation, discussed below).

In some cases, one or more accumulation operations could lead to the second addend being close to overflowing the most significant lane. Therefore, the apparatus may be configured to perform an exponent update operation.

The mantissa of the second floating point value is stored in the storage circuitry as a binary value, with each bit representing a value of $2^{(M)}$. Hence, shifting the mantissa one place left or right in its bit representation is equivalent to multiplying or dividing the mantissa by 2 respectively.

The exponent update operation may include updating the value of the exponent of the second floating point value. For example, the exponent may be increased or decreased by X. Then, the exponent update operation includes updating the bit significance of each bit of the second addend in dependence on the updated exponent of the second floating point value. For example, if the exponent is increased by X then the second addend may be right shifted by X places so that the overall second floating point value represents the same value.

It will be appreciated that the above is merely an example, and many different techniques may be used to update an exponent and to update the second addend in dependence on the updated exponent. In particular, different floating point formats may require different steps to be taken. However, in each example the bits of the second addend can be adjusted. Therefore, if the second addend is close to overflowing the most significant lane, the bits of the second addend can be adjusted to make overflowing less likely. For example, right-shifting each bit in the second addend moves the second addend one bit further away from overflowing.

The exponent update trigger condition is not particularly limited. It is desirable to minimise overhead in providing the logic to determine the trigger condition, and hence it is desirable for the trigger condition to be simple. In one example, the trigger condition includes detecting that one or more of the most significant bits of the second addend have changed value following an accumulation operation.

In some examples the exponent of the second floating point value may be adjusted by any number of bits. However, if the exponent is adjusted by a small number of bits then it is more likely that the exponent update operation will need to be re-performed sooner. In addition, shifting each bit may be an expensive operation, as each lane may need to be accessed to read the values stored therein and rewrite the values to a new position. Hence, in some examples, the exponent is updated by adjusting the exponent by a value equal to the number of bits in a lane. In some examples each lane, or each lane other than the most significant lane, has the same number of bits, which may be the number of bits used to update the exponent. The number of bits in a lane may be a large value, and hence by updating the exponent by the number of bits in a lane it may be less likely that an exponent update operation is required soon. In addition, by updating the exponent by the number of bits in a lane, the exponent update operation may be simplified. This is because in some examples the second addend is shifted by the same number of bits as the number by which the exponent is updated (X in the example above). Shifting a lane by the number of bits in a lane may be a particularly simple process, as values may not need to be moved at all. Instead, the lanes could simply be relabelled without values being moved. For example, if the exponent is adjusted by 4, then 4-bit lanes which previously represented values ($2^{13}$, $2^{12}$, $2^{11}$, $2^{10}$) and ($2^9$, $2^8$, $2^7$, $2^6$) could simply be relabelled to represent ($2^9$, $2^8$, $2^7$, $2^6$) and ($2^5$, $2^4$, $2^3$, $2^2$) and none of the values stored therein would need to be moved.

In some examples, the processing circuitry is configured to reference the bit significance information to select an addition alignment within the accumulating lane during the accumulation operation. Hence, the bit significance information provides an indication of which bits of the accumulating lane the first addend should be added to.

In some examples there is no particular limitation on what the first addend and second addend represent. However, the inventors have recognised that a particularly useful implementation of the present technique is found when the apparatus comprises a neural processing unit. A neural processing unit calculates weight values for an artificial neural network. This may involve updating the weight value several times by adding or subtracting a value derived from a gradient during a weight update operation. The value derived from the gradient may be several orders of magnitude smaller than the weight value to be updated. Hence, at least a subset of bits of the second addend may represent a weight value of the artificial neural network and the first addend may represent a value derived from a gradient for updating the weight value. This value may be equal to a gradient multiplied by a learning rate, for example. By storing the weight value across a number of lanes, and accessing only a single lane during each accumulation operation, a neural processing unit can update weights and therefore train an artificial neural network, with a reduced power consumption compared to a case in which the weight is not stored across a number of small buffers.

Floating point values are often represented in a chosen defined format, such as FP16 or BFloat16. The format has a number of mantissa bits and a number of exponent bits. The format defines the accuracy to which a floating point value can be represented (by the number of mantissa bits) and the range of values which can be represented by a floating point value (by the number of exponent bits). The number of bits in a given format is limited, and hence there is often a trade-off between accuracy and range. When two values have different magnitudes, it may be difficult to represent them simultaneously in a chosen floating point format (as will be discussed in further detail below). Hence, it is difficult to perform accumulation operations between the two values without truncating one of the values. Therefore, in order to perform an accumulation between floating point values which cannot be simultaneously represented in a chosen format, a large accumulation buffer may be provided to add these values. The present technique provides a power saving for accumulating values by providing a number of small buffers instead of a single large accumulation buffer. Hence, the present technique is particularly useful when the first addend is derived from a first floating point value and the second addend is derived from a second floating point value wherein the two floating point values are unable to be simultaneously represented within a chosen floating point format.

The present technique will now be described further with reference to the accompanying figures.

FIG. 1 schematically illustrates an example of a data processing apparatus 2 which has processing circuitry 4 for performing data processing operations including an accumulation operation in which a first addend is added to a second addend, storage circuitry 6 for storing the second addend across a plurality of lanes 8, power control circuitry 10 and a neural processing unit 12.

It will be appreciated that the FIG. 1 illustrates an example of the apparatus 2, and that the apparatus 2 could also have many other elements not shown in FIG. 1. For example, the apparatus 2 may also comprise storage circuitry for storing the first addend. In addition, the processing circuitry 4 may comprise calculating logic for calculating the first addend in a calculating operation prior to the accumulation operation. It will also be appreciated that the arrangement of features shown in FIG. 1 is not limiting, and the elements shown may take any relative arrangement, for example the storage circuitry 6 may be contained within processing circuitry 4.

In prior techniques, the second addend may be stored in a single accumulation buffer within the storage circuitry 6. However, in these cases the accumulation operation involves powering the entire accumulation buffer in order to perform the accumulation operation. The present technique proposes storing the second addend in a plurality of lanes in order to reduce the power cost of the accumulation operation.

Figure 2:
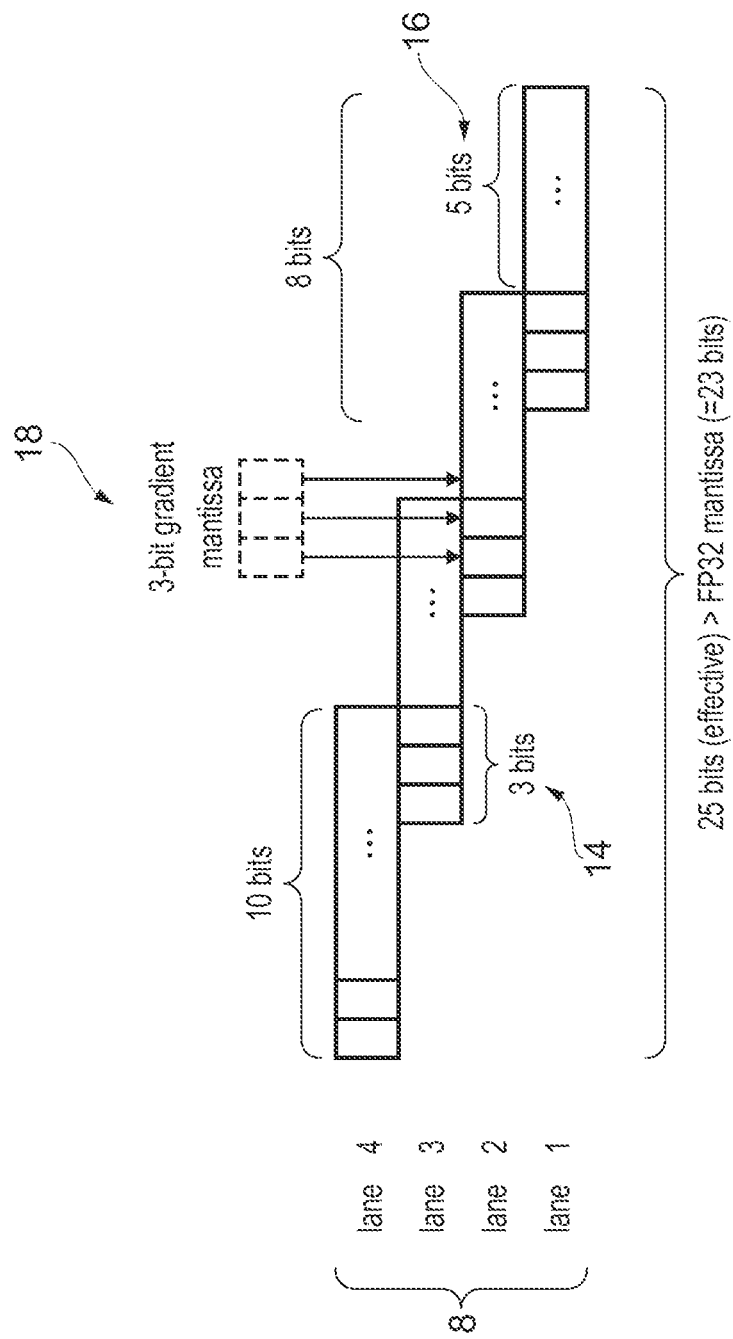
FIG. 2 schematically illustrates a logical arrangement of a plurality of lanes.

FIG. 2 schematically illustrates a logical arrangement of the plurality of lanes 8 shown in FIG. 1. Whilst FIG. 2 illustrates these lanes being arranged in a cascaded arrangement, it will be appreciated that in practice the lanes may be stored entirely separately in the storage circuitry 6 and that the cascaded arrangement is to illustrate the relative bit significance of each lane.

The plurality of lanes 8 shown in FIG. 2 are used to store the second addend. In the example of FIG. 2, the second addend is a 25-bit value. Each lane stores a contiguous subset of the bits of the second addend, and the subset of bits stored by each lane overlaps with the subset of bits stored by at least one other lane.

In the example of FIG. 2, the plurality of lanes 8 comprises four lanes, each having a different significance. A more significant lane has at least one bit with a higher bit significance than the most significant bit (MSB, the leftmost bit in a given lane) of a less significant lane. Hence, lane 4 is more significant than lanes 1-3, lane 3 is more significant than lanes 1-2 and less significant than lane 4, and so on. Lanes 1-3 each comprise 8 bits and lane 4 comprises 10 bits. Each lane other than the most significant lane (lanes 1-3) comprises three overlap bits 14 and five non-overlap bits 16. The overlap bits are set to a clear value (e.g. 0). The number of lanes and the number of bits in each lane is not particularly limited. Storing a second addend by providing more lanes with fewer bits in each lane might reduce the power cost associated with accessing an individual lane. However, it may increase the frequency with which an overlap update operation is triggered (discussed in more detail below). Likewise, fewer lanes with more bits in each lane increases the power cost associated with each accumulation operation but decreases the frequency of overlap update operations.

The processing circuitry 4 performs an accumulation operation in order to add a first addend to the second addend. In the example of FIG. 2, the first addend 18 is a 3-bit mantissa of a floating point value representing a gradient (to be discussed in detail below). By storing the second addend across the plurality of lanes 8, accumulation operations can be performed with a reduced power cost compared to the case where the second addend is provided in a single accumulation buffer, because the accumulation operation can select a lane in which to perform the accumulation operation and not incur the power cost of accessing the other lanes. Processing circuitry 4 refers to bit significance information associated with the first addend 18 to select a lane. The selected lane is the lane which contains bits with the same significance as the first addend 18. For example, the first addend 18 may have three bits having the bit significance, e.g. $2^5$, $2^4$, $2^3$ (determined based on bit significance information) and the selected lane is the lane which contains bits with the bit significance $2^5$, $2^4$, and $2^3$ (which may be determined based on stored information corresponding to the second addend). If two lanes both contain all of the bits with the same significance as the first addend (which will only be the case if the bits are all overlap bits) then the selected lane is the more significant lane. If the first addend 18 is the mantissa of a floating point value, then the bit significance of each bit can be determined by referring to the exponent of the floating point value.

The accumulation operation adds the first addend 18 into the selected accumulating lane (lane 2 in the example of FIG. 2). Providing a number of overlap bits 14 can ensure that this addition can be performed without overflowing the accumulating lane, because there will be at least one overlap bit within the accumulating lane into which any overflow from the addition operation can be stored. By preventing any overflow from the accumulating lane, the accumulation operation can be performed entirely within a single lane.

In the example of FIG. 2, the number of overlap bits in lanes 1-3 is three, which is the same as the number of bits in the first addend 18. Selecting the number of overlap bits to be the same as or greater than the number of bits in the first addend ensures that any accumulation operation can be performed without overflowing the accumulating lane. This is because there will always be at least one overlap bit which is more significant than the bits being accumulated with the first addend. This can be seen in FIG. 2, where the addition operation is between the 3-bit first addend 18 and the $2^{nd}$ to $4^{th}$ most significant bits of lane 2. If this addition overflows the $2^{nd}$ to $4^{th}$ most significant bits of lane 2, then it will overflow into the MSB of lane 2 which is an overlap bit, but could not overflow any more than that. Hence, the addition operation will not overflow the accumulating lane. If the first addend were to be moved one bit to the left, then one might expect that this would cover all of the overlap bits of lane 2 and hence make an overflow possible. However, if the first addend 18 were moved one bit to the left, it would overlap entirely with lane 3 and the addition would instead be performed in lane 3. However, if fewer overlap bits were provided than the number of bits in the first addend, then the first addend may entirely overlap with the overlap bits of a given lane and hence make overflow possible.

For example, if instead of three overlap bits 14 in lane 2 as shown in FIG. 2, there were instead two overlap bits, then the first addend 18 would be added to both overlap bits and the most significant non-overlap bit. The addition could not take place in lane 3 because the least significant bit of the first addend 18 does not overlap lane 3.

By providing a number of overlap bits equal to or greater than the number of bits in the first addend, an accumulation operation can be performed entirely within a single lane without overflowing. The power control circuitry may therefore place the lanes other than the accumulating lane in a lower power level than the accumulating lane during the accumulation operation. Hence, the accumulation operation can be performed using lower power than if more than one lane were accessed during the accumulation operation (for example if overlap bits had to be carried into the adjacent more significant lane, requiring the adjacent more significant lane to be accessed).

Figure 3:
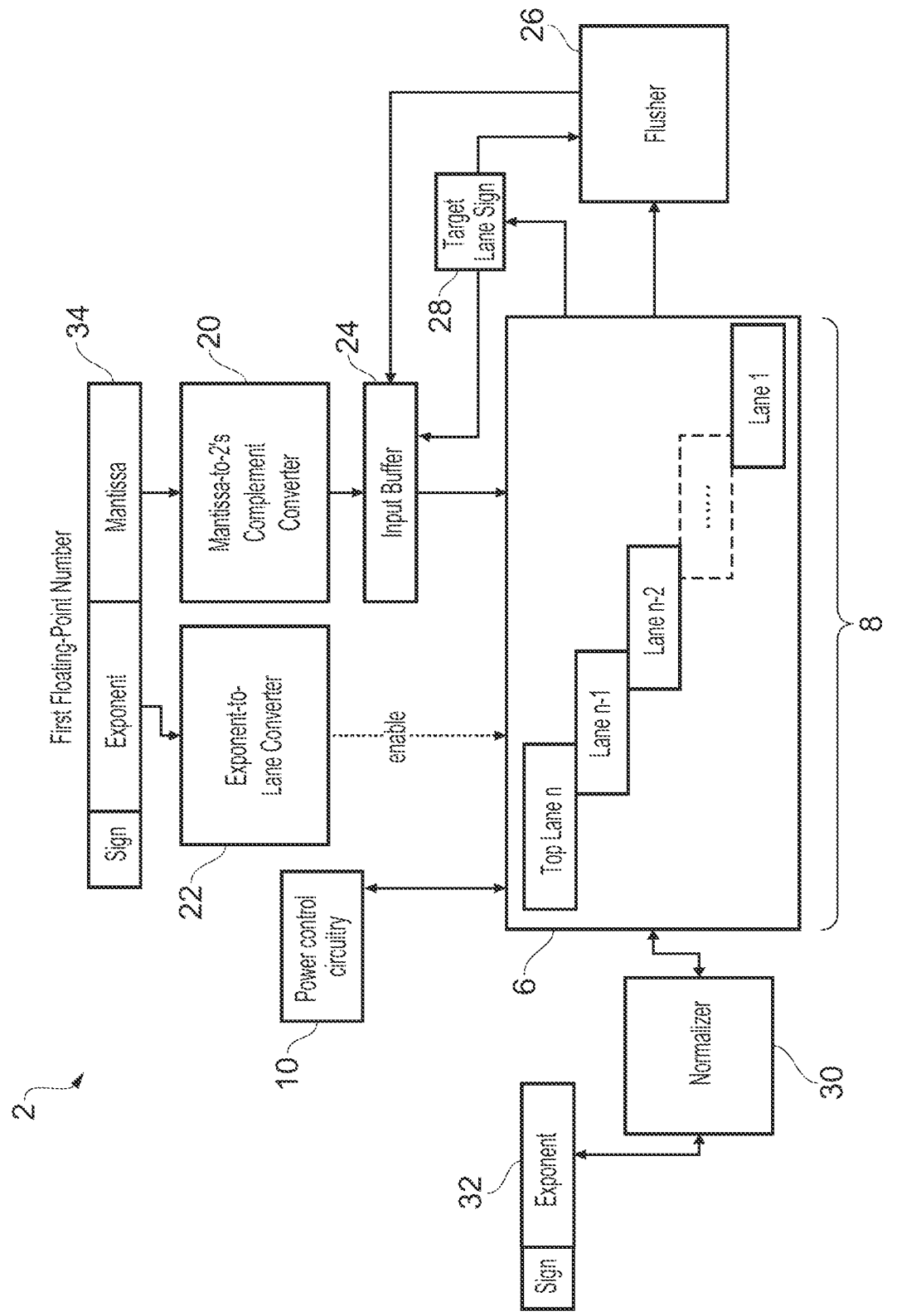
FIG. 3 illustrates an example arrangement of a data processing apparatus.

FIG. 3 illustrates an example arrangement of features for implementing the present technique. The apparatus 2 has storage circuitry 6 for storing a plurality of lanes 8 and power control circuitry 10 for controlling power supplied to the storage components forming the plurality of lanes. The apparatus also comprises, for example within the processing circuitry 4, an exponent-to-lane converter 22, a mantissa-to-two's complement converter 20, an input buffer 24, a flusher 26, a target lane sign buffer (TLSB) 28, and a normaliser 30. Also shown are a first floating point value 34, and a sign and exponent 32 of a second floating point value, for which the mantissa is stored in the plurality of lanes 8.

Figure 4:
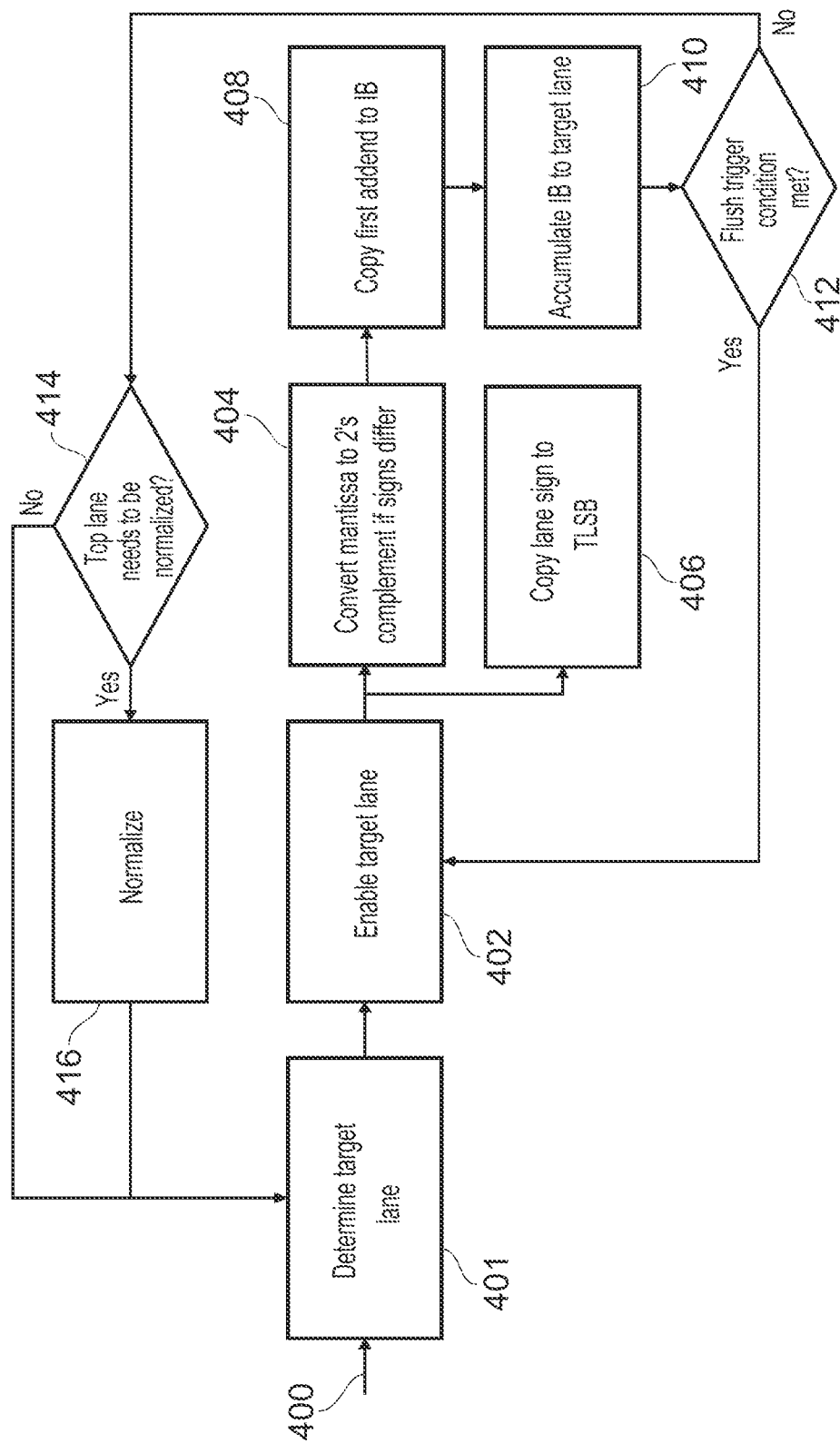
FIG. 4 illustrates a process for carrying out an accumulation operation.

FIG. 4 illustrates a processes for carrying out an accumulation operation using the apparatus of FIG. 3.

At step 400, the first floating point value 34 is received. The first floating point value 34 comprises a sign, a mantissa, and an exponent. The value represented by the floating point value 34 is given by constructing a significand from the mantissa, and multiplying the significand by a base raised to a power derived from the exponent. The base may be 2, for example.

At step 401, the exponent-to-lane converter 22 determines a target lane into which the first addend is to be added. The target lane is the lane which stores bits having the same bit significance as the bits of the first addend, and can be determined from the exponent of the first floating point value 34. The significance of each lane may be determined from the exponent of the second floating point value 32 (in FIG. 3 the mantissa portion of the second floating point value is stored within the storage circuitry (e.g. within the top lane)).

At step 402, the target lane is enabled by the power control circuitry 10. This may be carried out by accessing a storage location containing the target lane.

At step 404, the mantissa-to-two's complement converter 20 determines whether the mantissa of the first floating point value 34 is to be converted or not. This determination is based on a comparison between the sign of the first floating point value 34 and the sign of the second floating point value 32. If the signs of the two values are the same, then a positive value is to be added to a positive value. Hence, the mantissa does not need to be converted. However, if the signs differ then either a negative value is to be added to a positive value or vice versa, and hence the accumulation operation is a subtraction between the first and second floating point values. A subtraction between two binary numbers can be performed by converting one of the two numbers into two's complement form and thereafter adding the numbers, allowing a subtraction to be performed by adding values. Hence, when the signs differ, the mantissa of the first floating point value 34 is converted into two's complement form by the mantissa-to-two's complement converter 20. This allows the accumulation operation to perform both additions and subtractions by adding the first and second addend.

The value output by the mantissa-to-two's complement converter 20 is the first addend 18, and is stored in an input buffer 24 at step 408. The position of the first addend within the input buffer 24 is determined based on the bit significance information used to select the target lane. At this stage, the first addend may be sign-extended within the input buffer. For example, if the first addend is known to be negative (for example if it has been converted to two's complement form or based on the TLSB, to be discussed later) then the bits of the input buffer to the left of the first addend may be set to 1. Also at this stage, the first addend may be modified (for example, if the first addend is derived from the overlap bits of a negative lane during an overlap update operation, a +1 might be added, as discussed below with reference to FIG. 10). At step 406, which may be carried out simultaneously with either of steps 404 or 408, the sign of the target lane is stored in the TLSB 28. This can be performed by copying the value of the MSB of the target lane into the TLSB 28.

At step 410 the bits in the input buffer 24 are added to the bits of the target lane. Hence, the first addend is added to the second addend. The accumulation of step 410 takes place entirely within the target lane due to the presence of the overlap bits, at least one of which will be at a more significant bit position than the first addend, and hence any overflow from the addition operation can cause an overlap bit to be set, and therefore the operation remains within the accumulating lane.

The accumulation operation may result in overlap bits of the accumulating lane becoming set. Hence, a future accumulation operation may not be able to be performed entirely within one lane unless the overlap bits are cleared. Therefore, at step 412 the flusher 26 determines whether the flush (overlap update) trigger condition is met. While this may take several forms, in the present example the flush condition comprises determining whether both: any of the overlap bits of the accumulating lane differ from each other, and the sign of the target lane before the accumulation and the sign of the first floating point value are the same. The first step can be determined by reading and comparing the overlap bits of the target lane enabled in step 402. The second step can be determined by comparing the value stored in the TLSB 28 to the sign of the first floating point number 34.

If both conditions are true, then the trigger condition is met and an overlap update operation is triggered. In this case, the overlap bits are added to the adjacent more significant lane. For example, if the target lane is lane n−2 then the overlap bits are added to lane n−1. The relative bit significance is determined by the overlap of the lanes (and hence the bit significance information is implicit), and therefore the Z overlap bits are added to the Z least significant bits of the adjacent more significant lane.

In the examples of FIGS. 3 and 4, the overlap update operation is performed in the same way as the accumulation operation. The first addend is the overlap bits of the target lane of the accumulation operation. The new target lane is the adjacent more significant lane. The sign corresponding to the first addend is the sign stored in the TLSB 28. Hence, if the TLSB stores a 1, the first addend may be sign extended by 1s in the input buffer.

Following the overlap update operation, the overlap bits are cleared, because the values they store have been stored in the adjacent more significant lane.

If the overlap update operation causes any overlap bits in the adjacent more significant lane to become set then a further overlap update operation can be performed.

If either or both conditions are not met, then at step 412 it is determined that the trigger condition is not met. At this stage it is determined whether the top lane (the most significant lane) needs to be normalized. The top lane may need to be normalized when it is determined that the top lane is close to overflowing.

It can be determined whether the top lane needs to be normalized by determining whether the accumulation operation has caused any of one or more most significant bits of the top lane to be updated. For example, if the top bit is expected to be 0 but has its value updated to 1, then this suggests that the top lane may overflow soon, and hence a normalization operation should be triggered.

The normalization may be carried out by shifting the bits in the top lane right by a number of bits (and hence potentially losing the values stored in the least significant bits). The second addend stored in plurality of lanes 8 at least partially represents the mantissa of the second floating point value. Hence, if the second addend is shifted by a number of bits, then the exponent 32 should be adjusted by a value equal to the number of bits such that the second floating point value continues to be unchanged. This means that the bit significance of each bit in the second addend is adjusted. Therefore, the normalize step 416 comprises shifting the bits of the second addend and adjusting the exponent of the second floating point value by the same amount.

In the way described above, a first addend can be added to a second addend using a reduced amount of power, because the accumulation operation can take place within a single accumulation buffer storing a part of the second addend. An overlap update operation is provided to allow several first addends to be added to the same second addend in a series of accumulation operations, wherein each accumulation operation takes place within a single lane.

Figure 5:
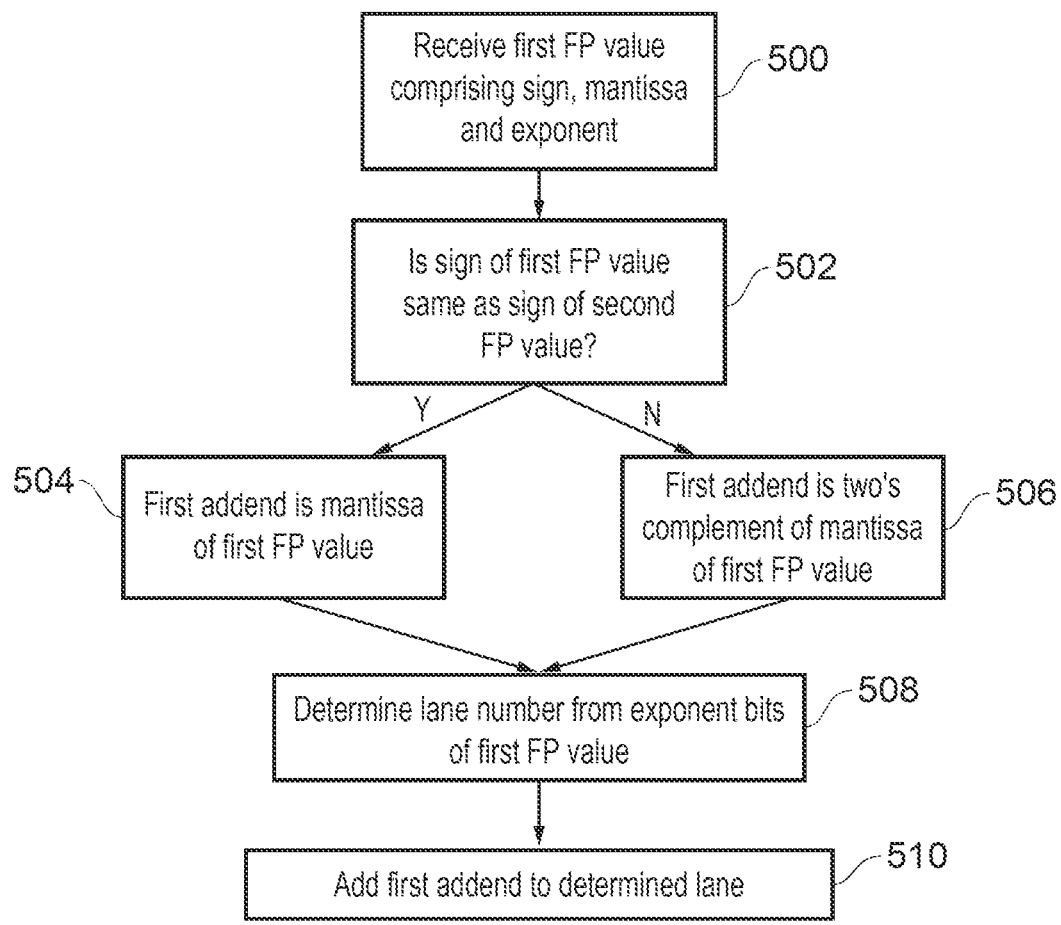
FIG. 5 illustrates a process for carrying out an accumulation operation.

FIG. 5 illustrates a method of carrying out the accumulation operation when the first and second addends are derived from floating point values. At step 500, a first floating point value comprising a sign, a mantissa, and an exponent is received at the processing circuitry, to be accumulated with the second floating point value stored in the plurality of lanes. At step 502 it is determined whether the sign of the first floating point value is the same as the sign of the second floating point value. If the signs are the same, then at step 504 the first addend is determined to be the mantissa of the first floating point value. If the signs are different, then at step 506 the two's complement of the mantissa of the first floating point value is determined to be the first addend. In either case, at step 508 an accumulating lane is determined by referencing the exponent of the first floating point value. The exponent indicates the bit significance of the mantissa bits of the first floating point value, and hence can be used to determine which of the plurality of lanes the first addend should be accumulated into. At step 510, the first addend is added into the accumulating lane. This addition takes place entirely within the accumulating lane, without overflowing the accumulating lane, because a number of overlap bits are provided at the most significant bit positions of the accumulating lane.

Figure 6:
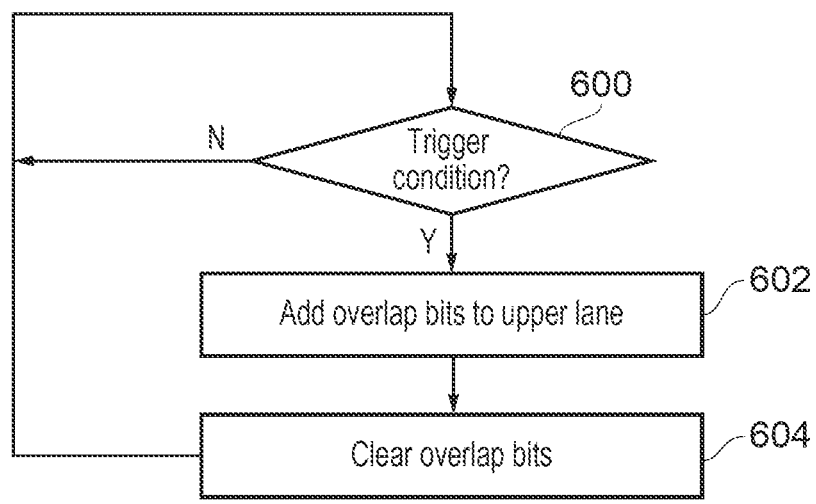
FIG. 6 illustrates a method of performing an overlap update operation.

FIG. 6 illustrates a method of performing an overlap update operation. At step 600, which may be performed directly following an accumulation operation or may be performed in response to a command, it is determined whether the trigger condition is satisfied for a given lane. If the trigger condition is not satisfied then no action is taken. However, if the trigger condition is satisfied, then an overlap update operation is performed. At step 602, the overlap bits of the given lane are added to bits with the same bit significance in the adjacent more significant lane. For example, this might be performed in an accumulation operation in which the first addend is the overlap bits of the given lane.

After the overlap bits have been added to the upper lane, then at step 604 the overlap bits are cleared. If the lane is positive then the overlap bits may be all set to 0, for example. If the lane is negative then the overlap bits may be all set to 1. This means that the overlap bits will be clear and allow future accumulation operations to be performed without overflowing the accumulating lane.

Figure 7:
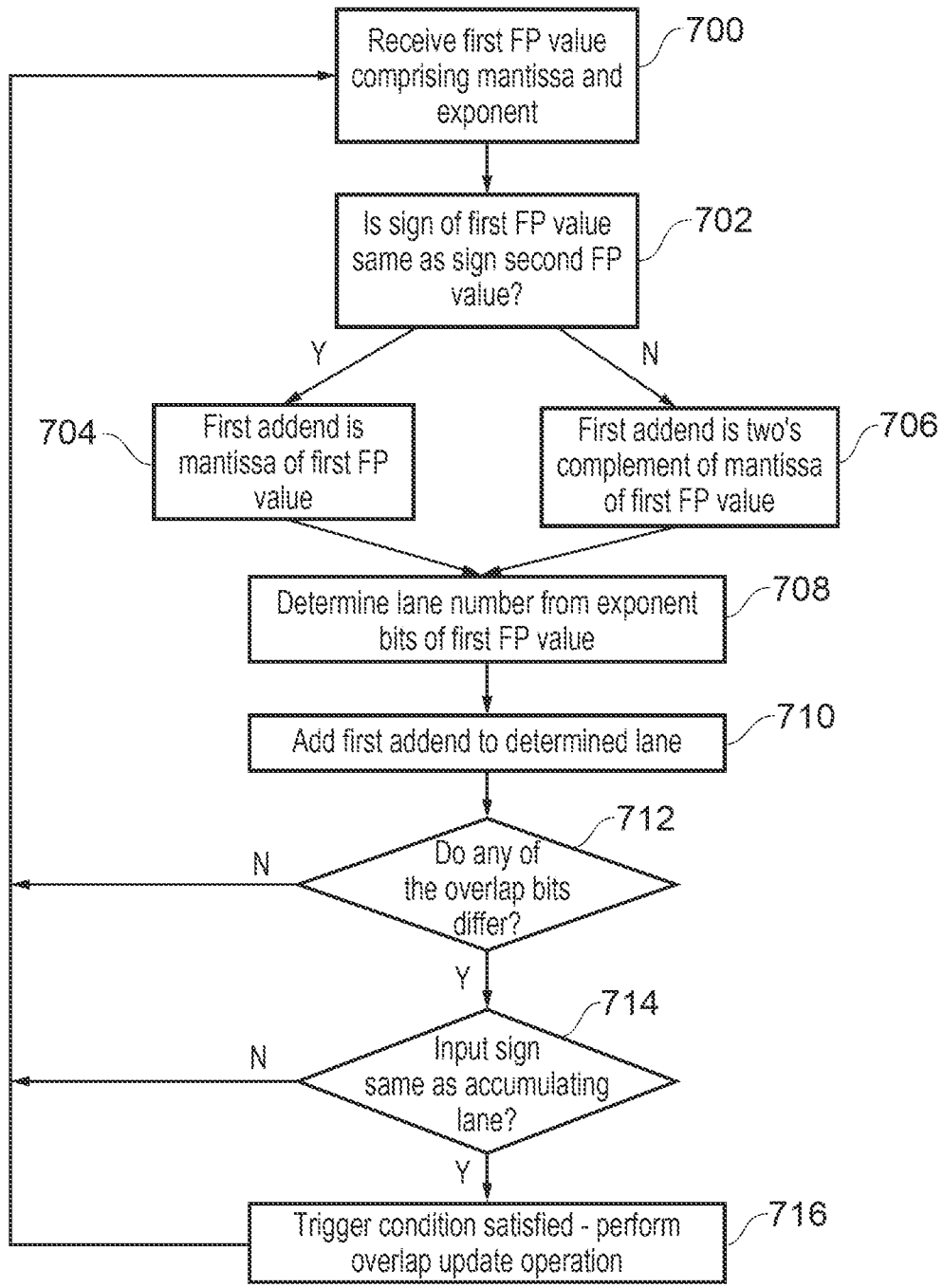
FIG. 7 illustrates a method of carrying out both the accumulation and overlap update operations.

FIG. 7 illustrates a method of combining the accumulation operation with the overlap update operation. Steps 700-710 correspond with steps 500-510 shown in FIG. 5. Following step 710, at step 712 the processing circuitry determines whether any of the overlap bits differ from each other. This will not be satisfied if the overlap bits are all 0 or all 1. However, if any of the overlap bits do differ, then at step 714 the processing circuitry determines whether the sign of the input (the first floating point value received at step 700) is the same as the sign of the accumulating lane prior to the accumulation operation at step 710. If both conditions are satisfied, the overlap update operation is performed at step 716. If one or both is not satisfied, then the overlap update operation is not performed.

Figure 8:
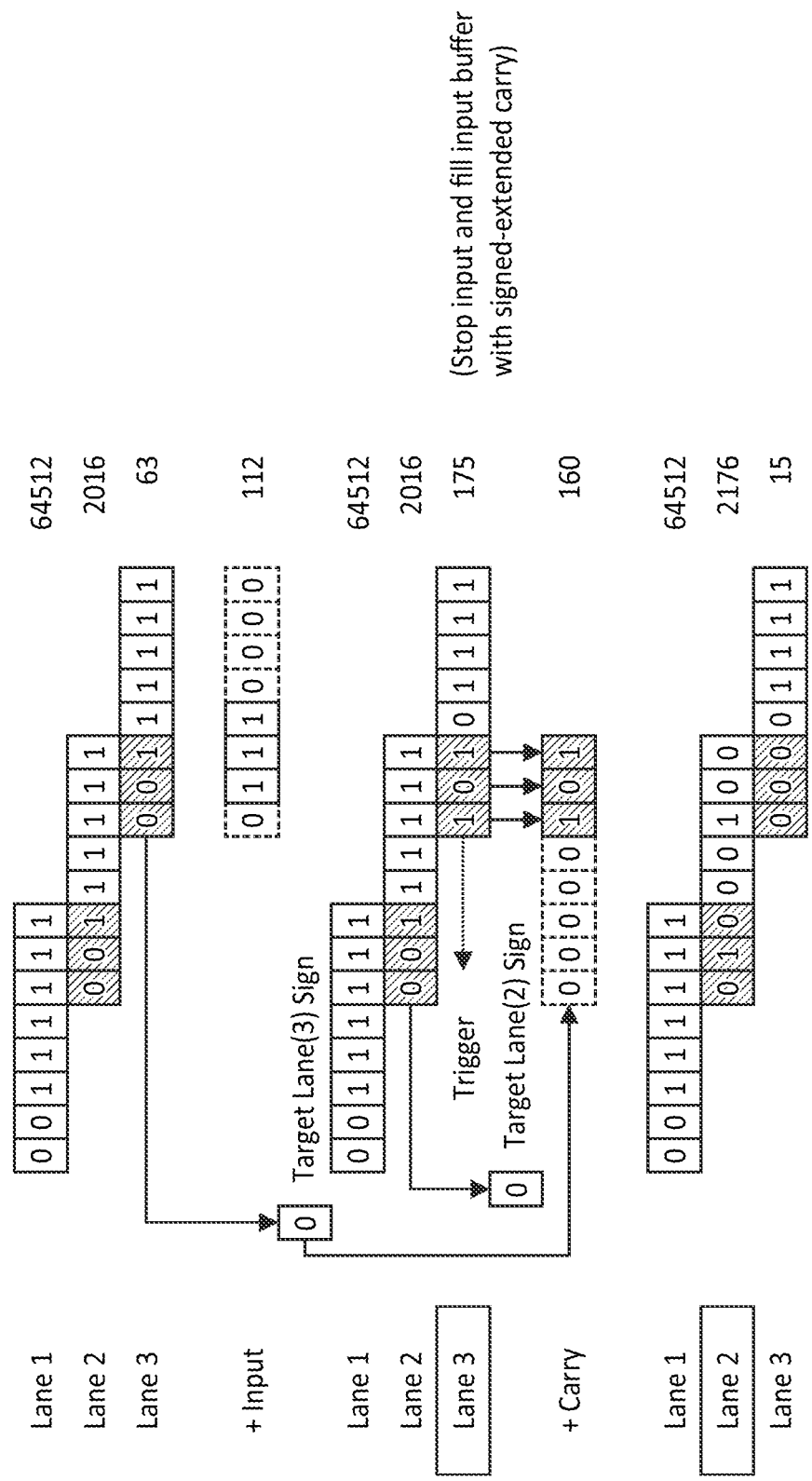

FIG. 8 is a worked example illustrating an accumulation operation. The second addend is stored in 3 lanes, each having 8 bits. The input buffer is therefore 8 bits long. The second addend has the value 66591, with 64512 stored in lane 1, 2016 stored in lane 2 and 63 stored in lane 3. The least significant bit of lane 3 has the bit significance $2^0=1$, the next most significant bit has the bit significance $2^1=2$, and so on. The value 112 is to be added to the second addend. $112=64+32+16=2^6+2^5+2^4$. The only lane containing bits having all of these significance values is lane 3, and therefore lane 3 is the selected lane. The first addend is placed in the input buffer in bit positions corresponding to bits of lane 3 having bit significances $2^6$, $2^5$, and $2^4$. It will be seen that the first addend is a 3-bit value, having the same number of bits as the number of overlap bits in each lane other than the most significant lane. As the first addend is a positive value, no sign extension is needed (equivalently, the first addend is sign extended by 0s). The MSB of lane 3 (which has the value 0) is stored to the target lane sign buffer TLSB so that the overlap update condition can be evaluated after the accumulation operation. Next, the bits of the input buffer (containing the first addend) are added to the selected lane, lane 3. Lane 3 previously stored the value 63 so the addition of 112 means that lane 3 stored the value 175 after the accumulation. The second addend (previously storing a value 66591) has now been updated by accumulating the first addend (representing 112) and the second addend now correctly stores the result of the operation (66703). The accumulation operation is complete, and has only accessed lane 3 of the second addend.

However, following the accumulation operation the most significant bit of lane 3 has been set to 1. This means that a future accumulation operation targeting lane 3 is at risk of overflowing lane 3. Hence, an overlap update operation may be triggered. The precise condition for triggering the overlap update operation may require that at least one of the overlap bits of lane 3 differs from the others and that the sign of the value stored in the TLSB is the same as the sign of the value added to the second addend (+112 in this case). These conditions are satisfied in the example of FIG. 8 so an overlap update operation is triggered. The target lane is selected as lane 2 (the adjacent more significant lane to lane 3). The input lane is cleared and then the overlap bits of lane 3 are stored in the input lane (these bits become a new first addend). The overlap bits are stored in the least significant bit positions of the input buffer because these positions correspond to the bits of lane 2 having the same bit significance as the first addend (e.g. the MSB of the first addend has a bit significance of $2^7$, which is the same as the third-least significant bit of lane 2). The value previously stored in the TLSB indicated the sign of lane 3 prior to the accumulation operation and is used to sign-extend the input buffer. Because the lane was positive before the accumulation (storing +63), following the accumulation of a positive value the lane remains positive, and therefore the overlap bits are positive and should be sign extended by 0s. The MSB of lane 2 (which has the value 0) is stored to the target lane sign buffer TLSB. An addition operation is then carried out between the bits stored in the input buffer and the selected lane, lane 2. The overlap bits of lane 3 are then cleared. It will be seen how, prior to the overlap update operation lanes 1, 2, and 3 stored the values 64512, 2016, and 175 respectively (summing to 66703). Following the update operation lanes 1, 2, and 3 stored the values 64512, 2176, and 15 respectively (summing to 66703). Hence, the total value of the lanes is unchanged by the overlap update operation, but the distribution of the bits in the lanes has changed. In particular, the overlap bits of lane 3 are now clear and lane 3 can be accessed in future accumulation operations without overflowing.

Following the overlap update operation from lane 3 to lane 2, a further overlap update operation may be performed from lane 2 to lane 1. However, it should be noted that the example of FIG. 8 is a worst-case example in which the non-overlap bits of lanes 2 and 3 were filled with 1s prior to the accumulation operation. In the majority of cases, no overlap update operation will be required at all, let alone more than one overlap update operation.

FIG. 9 illustrates a worked example similar to that shown in FIG. 8. The examples differ in that the example of FIG. 9 starts with each overlap having the cleared value of 0, whereas the example of FIG. 8 starts with some set bits in the overlap bits.

Figure 10:
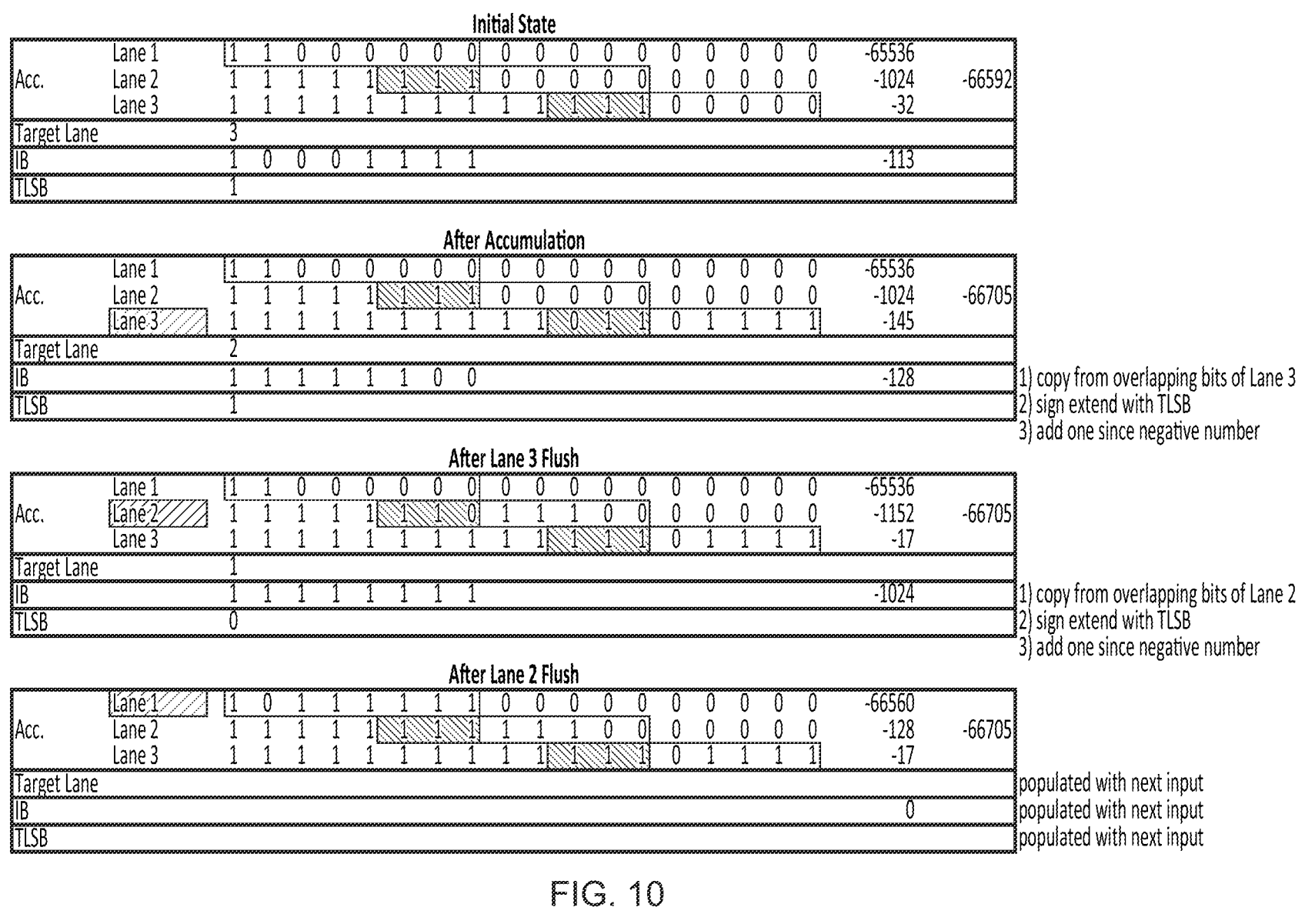

FIG. 10 illustrates a worked example in which the second addend stores a negative value. This can be seen because the most significant bit has the value of 1. As each lane is negative, lanes 2 and 3 are implicitly sign extended so that each bit to the left of lanes 2 and 3 is assumed to take the value 1. Because each lane is negative, a cleared value of the overlap bits is 1, and hence lanes 2 and 3 are shown with each overlap bit having the value 1. A negative value can be obtained by calculating the two's complement of the positive value. For example, $32=2^5$, so 32 is given by 0 . . . 0100000. The two's complement operation involves inverting each bit and then adding 1 in the least significant bit position. Performing this on 32, the inverted version is 1 . . . 1011111 and the two's complement, −32, is therefore 1 . . . 1100000 (which, it can be seen, is the value stored in lane 3). In the example of FIG. 10, 113 is to be subtracted from the second addend. 113=64+32+16+1 so 113 is given by 0 . . . 01110001, the inverted version is 1 . . . 10001110, and −113 is therefore 1 . . . 10001111, which is the value stored in the input buffer (ignoring the sign extended bits). The first addend can be considered to be three 0s in the bit positions $2^6$, $2^5$, and $2^4$ (hence a 3-bit first addend). The bits stored in the input buffer are added into lane 3, the selected lane, using a normal addition operation. Any carry-outs from the operation are not overflows (using the overflow rule for two's complement addition), are mathematically meaningless, and are discarded. The addition into lane 3 means that lane 3 has been updated from representing −32 to −145, and the subtraction of 113 from the second addend has been successfully completed. The accumulation operation is therefore complete.

An overlap update operation may be performed as in FIGS. 8 and 9. Following the accumulation operation, the overlap bits in lane 3 are not all the same, and the sign in the TLSB matches the sign of the value in the input buffer (they are both negative) so an overlap update operation is triggered. In this case, the values of the overlap bits of lane 3 are stored in the input buffer. There is no need to perform a two's complement operation as the negative lane 3 is to be added to a negative second addend (and hence the signs of the two addends do not differ).

After lane 3 is flushed to lane 2, the overlap bits in lane 3 should be cleared. There is no representation for a negative zero in the two's complement, therefore the overlap bits are emptied to −1 with the bit representation 111 . . . , rather than 0. Hence, the overlap bits of lane 3 should be made to become 111 by subtracting some number X, as in: L3−X=111, which is equal to X=L3−111. Since the bit representation −111 is equal to +1 (two's complement of 111 is 001), this simplifies to X=L3+1. The value of X is what is added to lane 2 (X is the value stored in the input buffer), and therefore the input buffer is filled with 011+1=100 (which is sign extended by 1s to become 11111100).

The bits in the input buffer are then added to the bits in lane 2, and the overlap bits of lane 3 can then be cleared to 1. This overlap update operation may then be repeated to update the overlap bits of lane 2 into lane 1.

It will be appreciated that while FIGS. 8 and 9 illustrate an example in which a positive value is added to a positive value, and FIG. 10 illustrates an examples in which a negative value is subtracted from a negative value, the technique is not limited to performing operations between values having the same sign. For example, a positive value can be added to a negative second addend using the described technique.

As discussed, there are no particular limits on what the first and second addends represent. However, the inventors have recognised that a particularly useful implementation of the present technique is found when the processing circuitry 4 comprises a neural processing unit 12 for calculating weight values for an artificial neural network.

Figure 11:
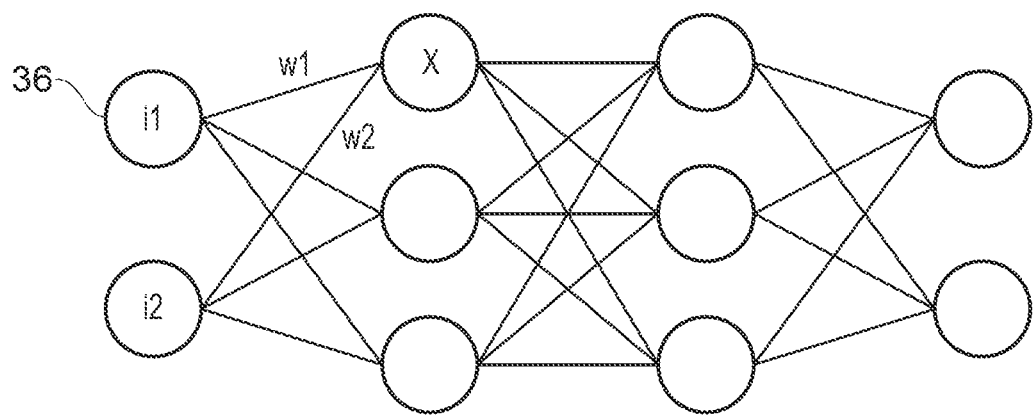
FIG. 11 illustrates an example of an artificial neural network.

FIG. 11 illustrates an example of an artificial neural network (ANN) comprising connected nodes 36. The ANN can be used to map input values to output values through a number of calculations. Input values are input into the input nodes in the input layer (at the leftmost side of the ANN in FIG. 11). The value of a node 36 in a subsequent layer (a hidden layer) can be calculated by first calculating a weighted sum of inputs. The inputs to a given node 36 (other than an input node) are the values of the nodes connected to the given node. These inputs can each be multiplied by a weight value associated with the link between nodes and then summed (and a bias associated with the node 36 can be added) to calculate a weighted sum of inputs. This weighted sum may then be fed into an activation function to calculate the value for that node. For example, the value of node X in FIG. 11 is equal to activation(i1*w1+i2*w2+bias). Input values can be fed through the ANN in this manner until output values are calculated.

An ANN can be trained to map a certain input to a certain output by updating the weight values associated with each link and the bias values associated with each node. An aim of using ANNs is that by training the ANN on a training set of inputs, the ANN will be able to correctly map an unseen input onto the correct output, and hence there are many potential uses for a well-trained ANN.

A training input that has a known expected output may be fed into the ANN. The output it actually produces and the expected output may be compared to calculate an error (loss). The intention is to minimise the error by training the ANN. This can be performed by updating each weight in the ANN.

In one example, the weights are updated using the following formula:

$$w_{n+1} = w_n - \eta * \frac{\partial E}{\partial w_n}$$

A given weight $w_n$ is adjusted by the value $$\eta * \frac{\partial E}{\partial w_n}$$

to produce an updated weight $w_{n+1}$. $\eta$ is a value called the learning rate.

$$\frac{\partial E}{\partial w_n}$$

is the gradient and is the partial derivative of a cost function with respect to the weight $w_n$. The cost function is a function measuring the error for a given set of training data. Hence, the value $$\frac{\partial E}{\partial w_n}$$

measures how much the error is affected by changes to the given weight value $w_n$. Updating the weights as shown above aims to reduce the error produced by the ANN for a given input.

The inventors have realised that in many cases, the weight value $w_n$ is much larger than the value being used to update it.

Floating point values represent a value using a predetermined number of mantissa bits and a predetermined number of exponent bits. The number of mantissa bits determines the accuracy with which a value can be represented, and the number of exponent bits determines the range which can be represented by the floating point value. For example, the 16-bit format FP16 has 5 exponent bits and 10 mantissa bits (and one sign bit). The 16-bit format BFloat16 has 8 exponent bits and 7 mantissa bits (and one sign bit). Hence, BFloat16 can represent a wider range of numbers than FP16 but at a lower degree of accuracy.

It may be difficult to perform the weight update operation using certain floating point values because it may be difficult to represent both values in the same floating-point format. For example, due to the small size of the value derived from the gradient, it may be required to use a floating point format having a greater number of exponent bits and therefore a larger range to represent this value, such as BFloat16. However, the limited number of mantissa bits in this format may mean that there is insufficient accuracy to represent the result of the weight update operation. Hence, 16-bit floating point formats having sufficient range to represent the first and second addends may have insufficient accuracy to represent the result of an accumulation operation between these addends. Therefore it may not be possible to perform certain accumulation operations using particular floating point formats.

To overcome this problem, in one example a larger floating point format could be used (such as FP32), but this may incur a large overhead. In another example, the mantissa of the floating point value representing the weight can be stored in an accumulation buffer having more bits than the mantissa. This increases the accuracy with which the weight can be represented, increasing the likelihood that a weight update operation can be performed. However, the accumulation buffer is typically quite large (it is larger than the mantissa of the FP value) and a large power cost may be incurred by accessing it to perform the weight update accumulation operation. Applying the present technique, the accumulation buffer can be split into a plurality of overlapping lanes, reducing the power cost associated with performing an accumulation operation. Therefore, the present technique allows weight updates (and therefore neural network training) to be performed with a reduced power cost.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Additionally, examples of the present technique may be configured according to the clauses below.

(1) An apparatus, comprising:
  processing circuitry configured to perform an accumulation operation in which a first addend is added to a second addend to produce an updated second addend; and
  storage circuitry configured to store the second addend in a plurality of lanes, each lane storing a plurality of contiguous bits of the second addend, and each lane having a significance different to that of each other lane, wherein a more significant lane has at least one bit with a higher bit significance than the most significant bit of a less significant lane;
  wherein each lane other than a most significant lane comprises at least one overlap bit, each overlap bit having the same bit significance as a bit in an adjacent more significant lane in the plurality of lanes;
  wherein the processing circuitry is arranged to perform the accumulation operation by:
    referencing bit significance information corresponding to the first addend to select an accumulating lane out of the plurality of lanes; and
    performing an addition operation between bits of the accumulating lane and the first addend;
  wherein the at least one overlap bit of the accumulating lane enables the addition operation to be performed without a possibility of overflowing the accumulating lane.

(2) The apparatus according to clause (1), in which:
  each lane other than the most significant lane comprises a number of overlap bits equal to or greater than the number of bits of the first addend.

(3) The apparatus according to clause (1) or clause (2), in which:
  the processing circuitry is configured to perform a series of accumulation operations, wherein the second addend is updated in response to performance of each accumulation operation in the series.

(4) The apparatus according to any of clauses (1) to (3), in which:
  in response to a trigger condition, the processing circuitry is configured to perform an overlap update operation, wherein:
    the values of one or more of the at least one overlap bit of a given lane are added to one or more bits with a corresponding bit significance in the adjacent more significant lane to update the value of the contiguous bits of the second addend stored within the adjacent more significant lane; and
    the values of the one or more of the at least one overlap bits of the given lane are then set to a predetermined value.

(5) The apparatus according to clause (4), in which:
  the trigger condition comprises detecting that, following a given accumulation operation, any of the overlap bits of the accumulating lane have different values from each other.

(6) The apparatus according to clause (5), wherein:
  the processing circuitry is configured to derive the first addend from a first value; and the trigger condition comprises detecting that, following a given accumulation operation, both:
    any of the overlap bits of the accumulating lane have different values from each other, and
    the sign of the first value is the same as the sign of the accumulating lane prior to the given accumulation operation.

(7) The apparatus according to clause (6), comprising a target lane sign buffer,
  wherein the processing circuitry is configured to store a value indicating the sign of the accumulating lane to the target lane sign buffer prior to performing the given accumulation operation.

(8) The apparatus according to any of clauses (1) to (7), comprising:
  power control circuitry configured to place lanes of the plurality of lanes other than the accumulating lane into a lower power level than the accumulating lane during the accumulation operation.

(9) The apparatus according to any of clauses (1) to (8), in which:
  each lane of the plurality of lanes is stored in a separate storage block within the storage circuitry.

(10) The apparatus according to clause (9), in which:
  during the accumulation operation, the processing circuitry is arranged to access the storage block corresponding to the accumulating lane and to not access the storage blocks corresponding to lanes other than the accumulating lane.

(11) The apparatus according to any of clauses (1) to (10), in which:
  the processing circuitry is configured to derive the first addend from the mantissa of a first floating point value; and
  the processing circuitry is configured to derive the bit significance information from an exponent of the first floating point value.

(12) The apparatus according to clause (11), in which:
  a subset of contiguous bits of the second addend comprise the mantissa bits of a second floating point value.

(13) The apparatus according to clause (12), in which:
  the processing circuitry is configured to derive the first addend by determining whether the first floating point value and the second floating point value have a same sign or an opposite sign; and
  when the values have the same sign, the first addend is derived by taking the value of the mantissa of the first floating point value as the first addend; and when the values have the opposite sign, the first addend is derived by calculating the two's complement of the mantissa of the first floating point value.

(14) The apparatus according to clause (12) or clause (13), in which:
in response to an exponent update trigger condition, the processing circuitry is configured to perform an exponent update operation, by:
updating the value of an exponent of the second floating point value, and
updating the bit significance of each bit of the second addend in dependence on the updated exponent of the second floating point value.

(15) The apparatus according to clause (14), in which:
the exponent is updated by adjusting the exponent by a value equal to the number of bits in a lane.

(16) The apparatus according to any of clauses (1) to (15), in which:
the processing circuitry is configured to reference the bit significance information to select an addition alignment within the accumulating lane during the accumulation operation.

(17) The apparatus according to any of clauses (1) to (16), in which:
the apparatus comprises a neural processing unit configured to calculate weight values for an artificial neural network; wherein
at least a subset of bits of the second addend represent a weight value of the artificial neural network; and
the first addend represents a value derived from a gradient for updating the weight value of the artificial neural network.

(18) The apparatus according to any of clauses (1) to (17), in which:
the processing circuitry is configured to derive the first addend from the mantissa of a first floating point value; and
a subset of contiguous bits of the second addend comprise mantissa bits of a second floating point value; wherein
the first floating point value and the second floating point value are unable to be represented simultaneously within a chosen floating point format.

(19) A method, comprising:
performing, using processing circuitry, an accumulation operation in which a first addend is added to a second addend to produce an updated second addend; and
storing the second addend in a plurality of lanes within storage circuitry, each lane storing a plurality of contiguous bits of the second addend, and each lane having a significance different to that of each other lane, wherein a more significant lane has at least one bit with a higher bit significance than the most significant bit of a less significant lane;
wherein each lane other than a most significant lane comprises at least one overlap bit, each overlap bit having the same bit significance as a bit in an adjacent more significant lane in the plurality of lanes;
wherein the accumulation operation is performed by the processing circuitry by:
referencing bit significance information corresponding to the first addend to select an accumulating lane out of the plurality of lanes; and
performing an addition operation between bits of the accumulating lane and the first addend;
wherein the at least one overlap bit of the accumulating lane enables the addition operation to be performed without the possibility of overflowing the accumulating lane

(20) A non-transitory computer-readable medium to store computer-readable code for fabrication of an apparatus comprising:
processing circuitry configured to perform an accumulation operation in which a first addend is added to a second addend to produce an updated second addend; and
storage circuitry configured to store the second addend in a plurality of lanes, each lane storing a plurality of contiguous bits of the second addend, and each lane having a significance different to that of each other lane, wherein a more significant lane has at least one bit with a higher bit significance than the most significant bit of a less significant lane;
wherein each lane other than a most significant lane comprises at least one overlap bit, each overlap bit having the same bit significance as a bit in an adjacent more significant lane in the plurality of lanes;
wherein the processing circuitry is arranged to perform the accumulation operation by:
referencing bit significance information corresponding to the first addend to select an accumulating lane out of the plurality of lanes; and
performing an addition operation between bits of the accumulating lane and the first addend;
wherein the at least one overlap bit of the accumulating lane enables the addition operation to be performed without the possibility of overflowing the accumulating lane.

The invention claimed is:

1. An apparatus, comprising:
processing circuitry configured to perform an accumulation operation in which a first addend is added to a second addend to produce an updated second addend; and
storage circuitry configured to store the second addend in a plurality of lanes, each lane storing a plurality of contiguous bits of the second addend, and each lane having a significance different to that of each other lane, wherein a more significant lane has at least one bit with a higher bit significance than the most significant bit of a less significant lane;
wherein each lane within at least a subset of the plurality of lanes comprises at least one overlap bit, each overlap bit having the same bit significance as a bit in an adjacent more significant lane in the plurality of lanes;
wherein the processing circuitry is arranged to perform the accumulation operation by:
referencing bit significance information corresponding to the first addend to select an accumulating lane out of the plurality of lanes; and
performing an addition operation between bits of the accumulating lane and the first addend.

2. The apparatus according to claim 1, in which:
each lane other than the most significant lane comprises a number of overlap bits equal to or greater than the number of bits of the first addend.

3. The apparatus according to claim 1, in which:
the processing circuitry is configured to perform a series of accumulation operations, wherein the second addend is updated in response to performance of each accumulation operation in the series.

4. The apparatus according to claim 1, in which:
in response to a trigger condition, the processing circuitry is configured to perform an overlap update operation, wherein:
the values of one or more of the at least one overlap bit of a given lane are added to one or more bits with a corresponding bit significance in the adjacent more significant lane to update the value of the contiguous bits of the second addend stored within the adjacent more significant lane; and
the values of the one or more of the at least one overlap bits of the given lane are then set to a predetermined value.

5. The apparatus according to claim 4, in which:
the trigger condition comprises detecting that, following a given accumulation operation, any of the overlap bits of the accumulating lane have different values from each other.

6. The apparatus according to claim 5, wherein:
the processing circuitry is configured to derive the first addend from a first value; and
the trigger condition comprises detecting that, following a given accumulation operation, both:
any of the overlap bits of the accumulating lane have different values from each other, and
the sign of the first value is the same as the sign of the accumulating lane prior to the given accumulation operation.

7. The apparatus according to claim 6, comprising a target lane sign buffer,
wherein the processing circuitry is configured to store a value indicating the sign of the accumulating lane to the target lane sign buffer prior to performing the given accumulation operation.

8. The apparatus according to claim 1, comprising:
power control circuitry configured to place lanes of the plurality of lanes other than the accumulating lane into a lower power level than the accumulating lane during the accumulation operation.

9. The apparatus according to claim 1, in which:
each lane of the plurality of lanes is stored in a separate storage block within the storage circuitry.

10. The apparatus according to claim 9, in which:
during the accumulation operation, the processing circuitry is arranged to access the storage block corresponding to the accumulating lane and to not access the storage blocks corresponding to lanes other than the accumulating lane.

11. The apparatus according to claim 1, in which:
the processing circuitry is configured to derive the first addend from the mantissa of a first floating point value; and
the processing circuitry is configured to derive the bit significance information from an exponent of the first floating point value.

12. The apparatus according to claim 11, in which:
a subset of contiguous bits of the second addend comprise the mantissa bits of a second floating point value.

13. The apparatus according to claim 12, in which:
the processing circuitry is configured to derive the first addend by determining whether the first floating point value and the second floating point value have a same sign or an opposite sign; and when the values have the same sign, the first addend is derived by taking the value of the mantissa of the first floating point value as the first addend; and
when the values have the opposite sign, the first addend is derived by calculating the two's complement of the mantissa of the first floating point value.

14. The apparatus according to claim 12, in which:
in response to an exponent update trigger condition, the processing circuitry is configured to perform an exponent update operation, by:
updating the value of an exponent of the second floating point value, and
updating the bit significance of each bit of the second addend in dependence on the updated exponent of the second floating point value.

15. The apparatus according to claim 14, in which:
the exponent is updated by adjusting the exponent by a value equal to the number of bits in a lane.

16. The apparatus according to claim 1, in which:
the processing circuitry is configured to reference the bit significance information to select an addition alignment within the accumulating lane during the accumulation operation.

17. The apparatus according to claim 1, in which:
the apparatus comprises a neural processing unit configured to calculate weight values for an artificial neural network; wherein
at least a subset of bits of the second addend represent a weight value of the artificial neural network; and
the first addend represents a value derived from a gradient for updating the weight value of the artificial neural network.

18. The apparatus according to claim 1, in which:
the processing circuitry is configured to derive the first addend from the mantissa of a first floating point value; and
a subset of contiguous bits of the second addend comprise mantissa bits of a second floating point value; wherein
the first floating point value and the second floating point value are unable to be represented simultaneously within a chosen floating point format.

19. A method, comprising:
performing, using processing circuitry, an accumulation operation in which a first addend is added to a second addend to produce an updated second addend; and
storing the second addend in a plurality of lanes within storage circuitry, each lane storing a plurality of contiguous bits of the second addend, and each lane having a significance different to that of each other lane, wherein a more significant lane has at least one bit with a higher bit significance than the most significant bit of a less significant lane;
wherein each lane within at least a subset of the plurality of lanes comprises at least one overlap bit, each overlap bit having the same bit significance as a bit in an adjacent more significant lane in the plurality of lanes;
wherein the accumulation operation is performed by the processing circuitry by:
referencing bit significance information corresponding to the first addend to select an accumulating lane out of the plurality of lanes; and
performing an addition operation between bits of the accumulating lane and the first addend.

20. A non-transitory computer-readable medium to store computer-readable code for fabrication of an apparatus comprising:
  processing circuitry configured to perform an accumulation operation in which a first addend is added to a second addend to produce an updated second addend; and
  storage circuitry configured to store the second addend in a plurality of lanes, each lane storing a plurality of contiguous bits of the second addend, and each lane having a significance different to that of each other lane, wherein a more significant lane has at least one bit with a higher bit significance than the most significant bit of a less significant lane;
  wherein each lane within at least a subset of the plurality of lanes comprises at least one overlap bit, each overlap bit having the same bit significance as a bit in an adjacent more significant lane in the plurality of lanes;
  wherein the processing circuitry is arranged to perform the accumulation operation by:
    referencing bit significance information corresponding to the first addend to select an accumulating lane out of the plurality of lanes; and
    performing an addition operation between bits of the accumulating lane and the first addend.

* * * * *